June 24, 1958 T. G. MacANESPIE 2,839,920
SEA STATE WAVE METER
Filed Jan. 5, 1956
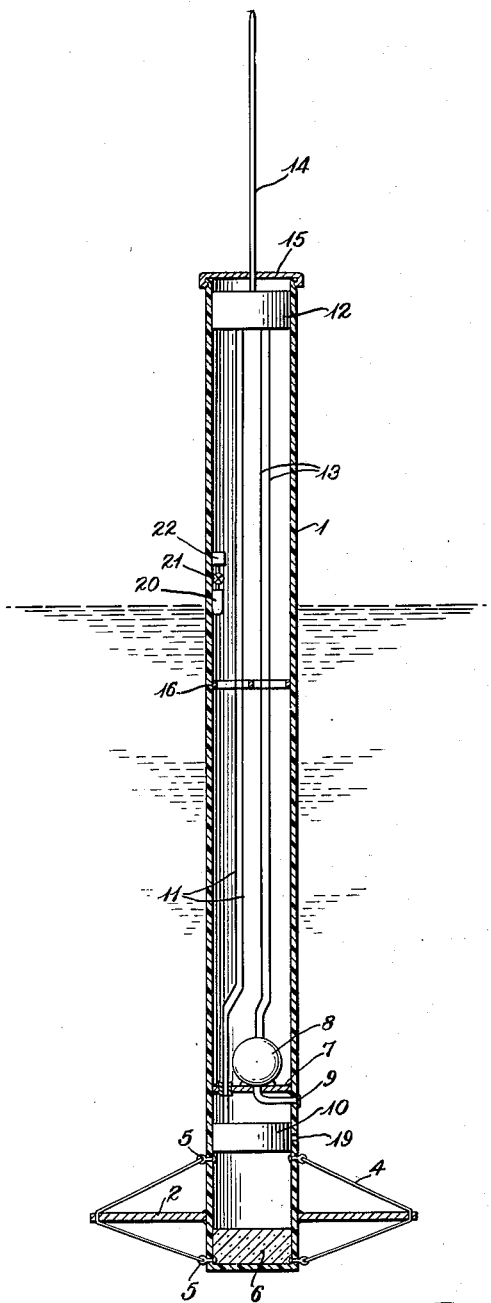
INVENTOR
*Thomas G. MacAnespie*
BY *Julian C. Renfro*
ATTORNEY Patented June 24, 1958

2,839,920

SEA STATE WAVE METER

Thomas G. MacAnespie, Middle River, Md., assignor to The Glenn L. Martin Company, Middle River, Md., a corporation of Maryland Application January 5, 1956, Serial No. 557,585

5 Claims. (Cl. 73—170)

The present invention relates to a remote indicating device and more particularly to a remote indicating, inflatable, airborne, droppable, sea state wave meter.

Heretofore, it is known to provide wave meters and to include in the instrument, means for relaying prescribed information to distant receivers. The transmission normally employed is that of radio and the information normally relayed includes indications concerning wave height and other aspects of the local conditions of the water in which the instrument is located.

The device of the present invention constitutes an improvement over presently known radio transmitting wave meters because of its unusual stability brought about by various novel design features of the device. Further, the device can be arranged to put forth via radio transmission indications concerning wave height, the mean elevation about which the waves are fluctuating, as well as their frequency. The device is also susceptible to providing indications via radio transmission of the specific gravity of the water in which it is located.

It is accordingly an object of the present invention to provide a remote indicating, inflatable and droppable sea state wave meter which will inherently be possessed of greater stability than radio transmitting wave meters which have heretofore been proposed.

It is a further object of the present invention to provide a novel sea state wave meter which can indicate wave height, the mean elevation about which waves are fluctuating, the frequency of the waves and the specific gravity of the water in which the device is located in a more expedient manner than devices which have heretofore been known for this purpose.

Other and further objects of the present invention will become more fully apparent as the following detailed description of a preferred embodiment of the invention progresses, particularly with reference to the accompanying drawing, in which is illustrated the device of the present invention as viewed in section.

Referring now in detail to the drawing, there is illustrated a preferred form of the present invention. It consists essentially of a hollow inflatable tube 1 of some length, for example about 30 feet long when inflated. A cap 15 is sealed to the top of tube 1. Attached to the lower end of the tube 1 is a damper plate 2 which is relatively large in diameter, with reference to the diameter of the tube 1. The plate 2 is held in its relative position by means of stiffeners or guy wires 4. As will be evident, the stiffeners 4 extend from the periphery of the damper plate 2 to eyelets which radially project from the surface of the tube 1 both above and below the position of the damper plate 2. For convenience, the eyelets have been designated in the drawing by the reference numeral 5.

In order to weight the lower end of the tube 1, a ballast, designed generally by the numeral 6, is attached to the lower end of the tube 1. The ballast may be in any suitable form and of any material whatsoever and its precise nature is not important to the invention. In place of the ballast there may be employed other equivalent means of which there may be mentioned, by way of example, gyroscopic means.

A watertight bulkhead 7 is fixed in the tube 1 dividing the interior space of the tube into an upper and a lower compartment. A pressure transducer 8 is fixed to bulkhead 7 and is contained within the tube 1 within the upper compartment; that is to say, in the space above the watertight bulkhead 7. A conduit 9 connected at one end to the pressure transducer passes through the watertight bulkhead 7, which is suitably apertured for this purpose and is connected to an opening in the wall of tube 1; thereby permitting water to enter through the conduit 9 and exert an influence upon the pressure transducer 8. Fixed in the tube 1 at a position below the watertight bulkhead 7 and consequently in the lower compartment is a sea water activated battery 10. An aperture 19 defined in the wall of tube 1 enables sea water to enter the battery 10. A pair of leads 11 connect the sea water activated battery 10 with a small radio transmitter 12, located at the top of tube 1. As it is necessary for these leads to pass through the watertight bulkhead 7 it, of course, is apertured for this purpose. A second pair of leads 13 connect the pressure transducer 8 with the small radio transmitter 12 and thus signals generated in the pressure transducer 8 are relayed by this means to the transmitter 12. An antenna 14 connected with the radio transmitter 12, projects through the cap 15 sealing the top of tube 1 in order to facilitate the transmission of radio messages to suitable receiving equipment. One or more stiffeners 16 are located between the transducer 8 and transmitter 12 to forestall collapse of the tube 1.

Although any means can be employed to inflate the tube 1, it is preferred that the inflating mechanism consist of a compressed gas container 20 connected to a suitable trigger mechanism 22 via a valve 21. The trigger mechanism 22 can be such as to condition the valve 21 and container 20 for the release of compressed gas in response to any desired event or at the will of an operator.

The device in use exhibits extreme stability. This is primarily brought about by the large damper plate 2 located at the bottom of the tube 1. In normal use, the tube is approximately two-thirds submerged and thus, if it be about 30 feet long, the damper plate will be located approximately 20 feet below the surface of the water in a location, or at a depth, where the water is comparatively calm and smooth. The device functions to provide an indication of wave height and further an indication of the mean elevation about which waves are fluctuating, as well as the frequency of the waves. It is fully possible with the device of the present invention, as described above, to attain an indication of the specific gravity of the water. This aspect of the invention is achieved by constructing the device with a known weight and determining its buoyancy characteristics when inflated. Consequently, in operation, the device performs as a hygrometer. It will be possible to determine from the signals transmitted the mean extent to which the device is submerged in terms of a linear measure. With a knowledge of the weight of the device and its buoyancy characteristics, the specific gravity of the sea water can be calculated or alternatively a suitable measuring instrument can be calibrated to show the signals transmitted directly in terms of specific gravity.

It is within the contemplation of the invention that the device be constructed of a light, thin watertight material, such as a plastic, and further it can be designed to be inflatable in the same manner as an inflatable raft. By adopting known techniques, it is possible to arrange the wave meter in a drop container or in other packaged form so that the device could be dropped from an aircraft to the surface of the body of water, where it would inflate and assume a floating position, approximately two-thirds submerged. Variation in the surface conditions of the water layer causes alternate increase and decrease of pressure at the lower end, which fluctuations of pressure are sensed by the pressure transducer 8 which in turn changes or modulates the radio frequency transmitted and thus presents a variable signal correlated to fluctuations of pressure, which can be picked up by suitable receiving equipment, and decoded.

The device, in effect, functions as a low frequency response system which can be utilized for many purposes. In addition to those mentioned in the preceding, there may be mentioned the use of the device to determine the buoyancy of a particular portion of sea water, for example, that portion overlying a sand bar. In this instance, the buoyancy of the sea water can be determined as an indication as to whether or not a given ship can safely pass over the sand bar. As will be recognized, information of this general character would be of great value to a port authority having such a sand bar located at the entrance to or in the channel of a harbor.

Although the present invention has been described with reference to a specific embodiment, nevertheless various changes and modifications which are obvious to one skilled in the art are deemed to be within the spirit, scope and contemplation of the invention.

What is claimed is:

1. A stabilized sea state wave meter designed to float substantially upright in the water with the greater portion of its length submerged, comprising an elongated tube closed at each end, a damper plate fixed adjacent the lower end of the tube and thereby located a sufficient depth below the surface of the water as to be disposed in substantially non-vertically rising water, said damper plate having a diameter substantially greater than the diameter of said tube and disposed in a plane generally transverse to the center line of said tube, and means in said tube for sensing fluctuations in hydraulic pressure indicative of the sea state.

2. The stabilized sea state wave meter as defined in claim 1 in which said pressure sensing means is a pressure transducer, and transmitter means electrically connected to said transducer for transmitting information as to sea state to a remote location.

3. A stabilized sea state wave meter designed to float substantially upright in the water with the greater portion of its length submerged, comprising an elongated tube closed at each end, a damper plate fixed adjacent the lower end of the tube and thereby located a sufficient depth below the surface of the water as to be disposed in substantially non-vertically rising water, said damper plate having a diameter substantially greater than the diameter of said tube and disposed in a plane generally transverse to the center line of said tube, a pressure transducer disposed in said tube for sensing fluctuations in hydraulic pressure indicative of sea state, a conduit communicating said pressure transducer with the exterior of said tube at a submerged location, a radio transmitter electrically connected to said transducer, and an antenna electrically connected to said transmitter and located adjacent the upper portion of said tube for the transmission of information to a remote location, said meter, because of its great stability in the water, being effective to transmit information as to height and frequency of the waves.

4. The stabilized sea state wave meter as defined in claim 3 in which said tube is inflatable, with inflating means being disposed in said tube for inflating said tube at time of use.

5. The stabilized sea state wave meter as defined in claim 3 in which a sea water activated battery mounted in the lower portion of the tube is arranged to supply electrical power for the transmission of information to the remote location.

References Cited in the file of this patent

UNITED STATES PATENTS

| | | |
|---|---|---|
| 1,048,671 | Fidler | Dec. 31, 1912 |
| 2,163,795 | Merralls | June 27, 1939 |
| 2,497,852 | Arenstein | Feb. 21, 1950 |
| 2,593,432 | Freas | April 22, 1952 |
| 2,629,083 | Mason | Feb. 17, 1953 |
| 2,750,794 | Downs | June 19, 1956 |
| 2,751,953 | Grimm | June 26, 1956 |

FOREIGN PATENTS

| | | |
|---|---|---|
| 393,423 | Great Britain | June 8, 1933 |